US008429200B2

(12) United States Patent
Mayatskikh et al.

(10) Patent No.: US 8,429,200 B2
(45) Date of Patent: Apr. 23, 2013

(54) USING A SEPARATE PROCESS IN AN INTERACTIVE COMPUTER PROGRAMMING ENVIRONMENT AS A DATABASE

(75) Inventors: Vitaly Mayatskikh, Brno (CZ); Yulia Kopkova, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 327 days.

(21) Appl. No.: 12/698,587

(22) Filed: Feb. 2, 2010

(65) Prior Publication Data

US 2011/0191385 A1    Aug. 4, 2011

(51) Int. Cl.
G06F 9/45       (2006.01)
G06F 17/30      (2006.01)

(52) U.S. Cl.
USPC .......................................... 707/802; 717/136

(58) Field of Classification Search .................. 707/802; 717/136
See application file for complete search history.

(56) References Cited

U.S. PATENT DOCUMENTS

| | | | |
|---|---|---|---|
| 5,940,827 A * | 8/1999 | Hapner et al. ................. | 707/703 |
| 6,360,358 B1 * | 3/2002 | Elsbree et al. ................. | 717/120 |
| 2003/0130980 A1 * | 7/2003 | Bell et al. ..................... | 707/1 |
| 2004/0225645 A1 * | 11/2004 | Rowney et al. ................ | 707/3 |
| 2005/0114799 A1 * | 5/2005 | Rossler et al. ................. | 715/864 |
| 2006/0136464 A1 * | 6/2006 | Rossmann ..................... | 707/102 |
| 2006/0156086 A1 * | 7/2006 | Flynn et al. ................... | 714/712 |
| 2008/0295078 A1 * | 11/2008 | Stall et al. .................... | 717/125 |
| 2008/0320444 A1 * | 12/2008 | Meijer et al. .................. | 717/110 |
| 2009/0043794 A1 * | 2/2009 | Rosenberg et al. ........... | 707/101 |

OTHER PUBLICATIONS

Brinkley et al., Slisp: A Flexible Software Toolkit for Hybrid, Embedded and Distributed Applications, Jan. 1997, John Wiley & Sons, Ltd., pp. 33-48.*
Miller et al., SISC for Seasoned Schemers, 2002, pp. 1-157.*
Tung, Visualizing Evaluation in Scheme, 1998, Kluwe Academic Publishers, Boston, pp. 201-222.*
Gorrie et al., SLIME User Manual version 3.0-alpha, file creation date Jan. 8, 2009; publicly made available, pp. 1-50.*
Falcone, A Programmable Interface Language for Heterogeneous Distributed Systems, Nov. 1987, ACM Transactions on Computer Systems, pp. 330-351.*
Cooper, Jr., Basic Lisp Techniques, 2003, Franz Inc. and David J. Cooper, Jr., pp. 1-100.*
Allen et al., DrJava: A Lightweight Pedagogic Environment for Java, 2002, ACM, pp. 137-141.*
"Read-eval-print-loop", accessed at: http://en.wikipedia.org/wiki/REPL on Jan. 27, 2010, last updated Jan. 26, 2010, 3 pages.
"S-expression", accessed at: http://en.wikipedia.org/wiki/S-expression on Jan. 27, 2010, last updated Jan. 27, 2010, 3 pages.
"Inter-process communication", accessed at: http://en.wikipedia.org/wiki/Interprocess_communication on Jan. 27, 2010, last updated Jan. 6, 2010, 3 pages.

* cited by examiner

Primary Examiner — Jorge A Casanova
(74) Attorney, Agent, or Firm — Lowenstein Sandler LLP

(57) ABSTRACT

Some embodiments of a system and a method to use a separate process in an interactive computer programming environment as a database have been presented. For instance, both server and client may run in an interactive computer programming environment, such as Read-Eval-Print Loop (REPL) environment. The server may receive data manipulating instructions written in a generic programming language and data from the client. The server can execute the instructions to manipulate the data. The server may further act as a database for the client by maintaining persistence of the data.

15 Claims, 4 Drawing Sheets

USING A SEPARATE PROCESS IN AN INTERACTIVE COMPUTER PROGRAMMING ENVIRONMENT AS A DATABASE

TECHNICAL FIELD

Embodiments of the present invention relate to database management, and more specifically to using a separate process in an interactive computer programming environment (such as Read-Eval-Print Loop environment) as a database.

BACKGROUND

Conventionally, storing data in a database is a complex problem. Internal data of running program generally has to be serialized to some external format, and special queries in domain-specific language (DSL), such as Sequential Query Language (SQL), have to be constructed and passed to a conventional database. The conventional database then translates the queries back to internal representation, de-serializes data into machine format, and performs actions in response to the queries. The actions performed typically include fetching and storing data from disks or in-memory files, again in an alien format.

Interaction with conventional databases typically requires special design of software, which involves analyzing requirements, designing table structures, and using data queries in DSL. Quite often, it is hard to perform all manipulations over data using SQL because SQL suffers from many well-known limitations.

Besides the required use of DSL, another problem with conventional databases is the limitation of data format used. Typically, data has to be provided to a conventional database in a table format. Unfortunately, not all data structures can be easily converted and stored in the form of tables.

BRIEF DESCRIPTION OF THE DRAWINGS

The present invention is illustrated by way of example, and not by way of limitation, in the figures of the accompanying drawings and in which.

DETAILED DESCRIPTION

Figure 1:
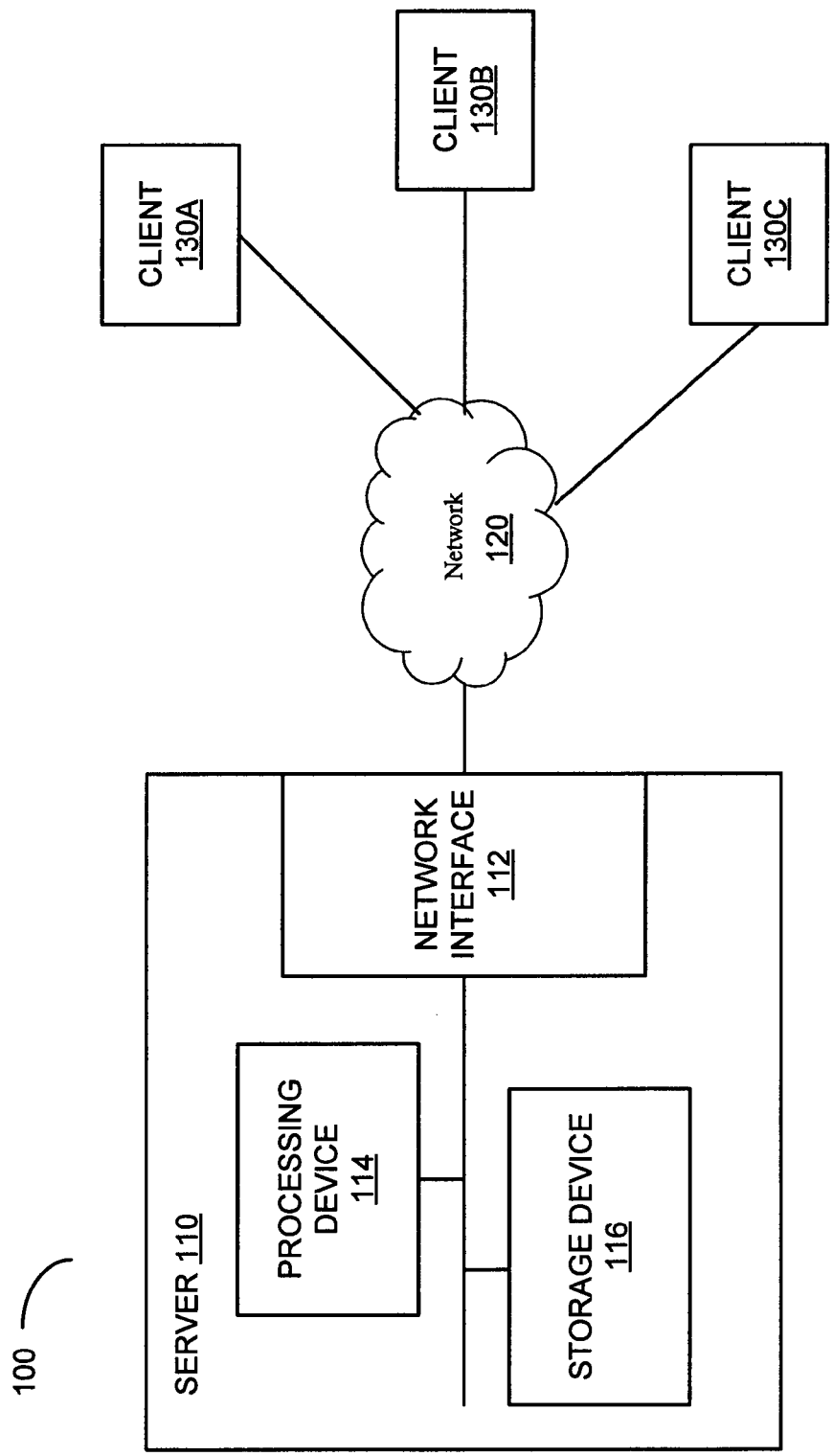
FIG. 1 illustrates one embodiment of a system usable in some embodiments of the current invention.

Described herein are some embodiments of a method, an apparatus, and a system to use a separate process in an interactive computer programming environment as a database. In one embodiment, all data manipulations are done using a single generic programming language, and then split into client and server parts. For instance, a client sends both data manipulating instructions and data to a server. The data manipulating instructions are written in a generic programming language. Both the client and the server run in an interactive computer programming environment, such as Read-Eval-Print Loop (REPL) environment. The server then executes the data manipulating instructions to process the data. By maintaining data persistence, the server may act as a database for the client. This approach does not require special planning of storage design. Data in the form of many different objects can be stored remotely and retrieved back in an opaque way without using any table or domain-specific language (DSL), such as Sequential Query Language (SQL). More details of some embodiments of how to use a separate process in an interactive computer programming environment as a database are described below.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions below are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "acting" or "storing" or "converting" or "executing" or "evaluating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a machine-readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required operations. The required structure for a variety of these systems will appear from the description below. In addition, the present invention is not described with reference to any particular programming language. It will be appreciated that a variety of programming languages may be used to implement the teachings of the invention as described herein.

Figure 4:
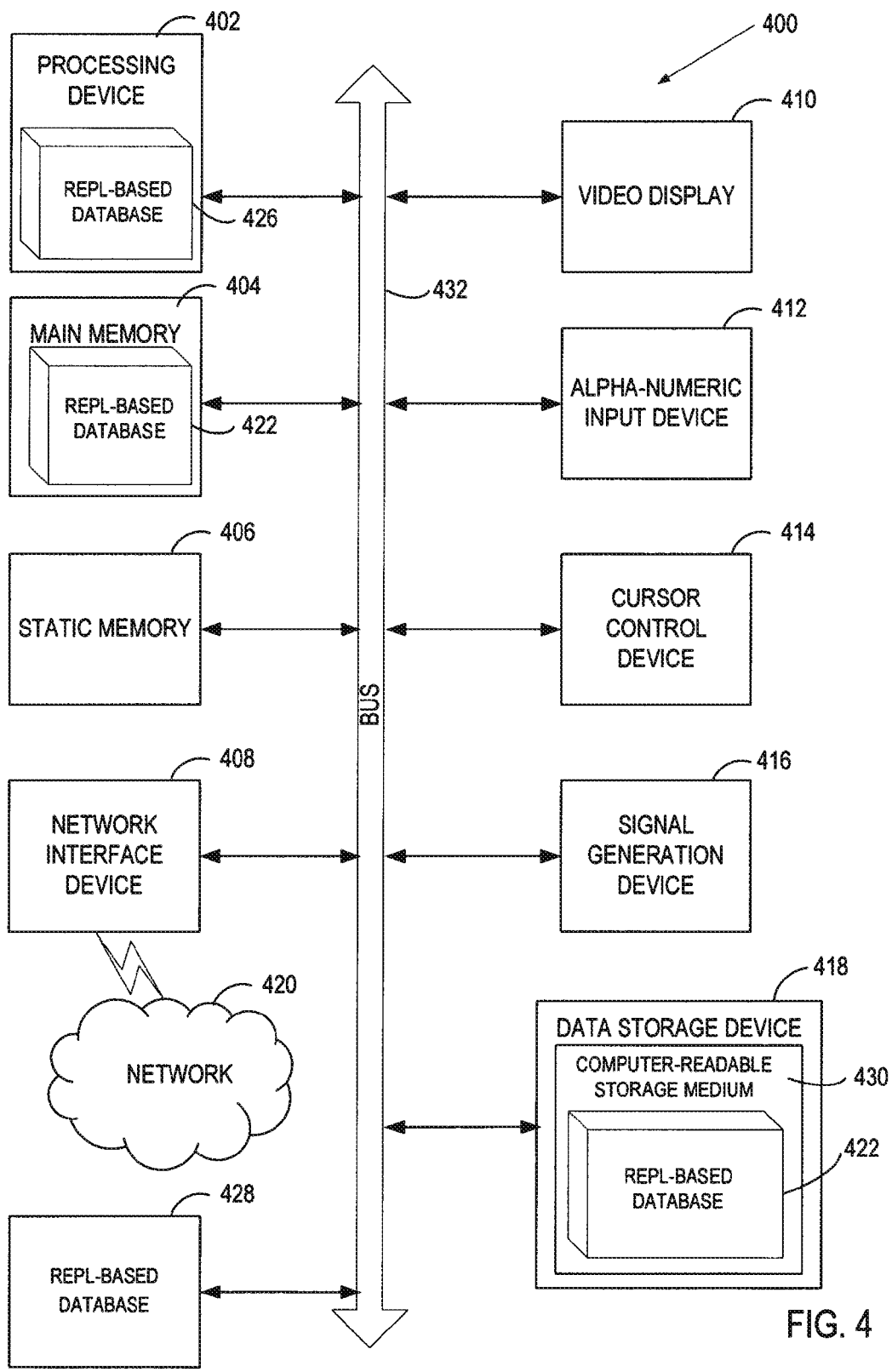
FIG. 4 illustrates a block diagram of an exemplary computing system.

FIG. 1 illustrates one embodiment of a system usable in some embodiments of the current invention. The system 100 includes a server 110 and a number of clients 130A-130C, each of which may include software, hardware, firmware, or a combination of any of the above. The server 110 is coupled to the clients 130A-130C via a network 120 or server and client processes can be placed on the same hardware, using interprocess communications to communicate with each other. The network 120 may include various networks, such as a loopback device, a local area network (LAN), Ethernet, wide area network (WAN), Internet, etc. Note that there may be more devices coupled to the network 120 in other embodiments, such as additional servers, client machines, data storage devices (e.g., magnetic disks, optical disks, etc.), and the like. Each of the clients 130A-130C may be implemented on one or more computing machines, such as a desktop personal computer, a laptop computer, a personal digital assistant, a smart phone, etc. Details of one example of a computing machine are illustrated in FIG. 4.

In some embodiments, the server 110 and the clients 130A-130C run in a built-in or specially implemented interactive computer programming environment, such as a Read-Eval-Print Loop (REPL) environment. A REPL, also known as an interactive top-level, is a simple, interactive computer programming environment. In a REPL, a user may enter expressions, which are evaluated, and then the results are displayed. The name Read-Eval-Print Loop comes from the names of the Lisp primitive functions, namely, read, eval, and print, which implement this functionality. The read function accepts a single expression from a user and parses it into a data structure in memory. For instance, the user may enter an s-expression (+1 2 3), which is parsed into a linked list containing four data elements. The eval function takes this internal data structure and evaluates it. In Lisp, an s-expression beginning with the name of a function is evaluated by calling that function on the arguments that make up the rest of the expression. So, for the s-expression (+1 2 3), the function sum, +, is called on the arguments 1, 2, and 3, yielding a result of 6. Lastly, the print function takes the result yielded by the eval function, and outputs it by printing. If the result is a complex expression, it may be specially formatted to make it easier to understand. However, in the current example, the number 6 does not need much formatting to print. Because the print function outputs in the same textual format that the read function uses for input, most results are printed in a format that could be readily copied and pasted back into the REPL.

In some embodiments, the server 110 includes a network interface 112, a processing device 114, and a storage device 116. The network interface 112 may receive data manipulating instructions and data from one or more of the clients 130A-130C via the network 120. The data manipulating instructions may be written solely in a generic programming language, such as Scheme, Common Lisp, Python, etc. When the clients 130A-130C transmit data manipulating instructions and data to the server 110, the clients may use the print function to convert the data manipulating instructions and data into a uniform representation (e.g., textual representation) suitable for transmission over the network 120. When the server 110 receives the data manipulating instructions and data in the uniform representation, the server 110 may run a separate process in the interactive computer programming environment to process the data accordingly. For example, in a REPL environment, the processing device 114 may use the read function to convert the data manipulating instructions and data into an internal format usable by the server 110. Then the processing device 114 may further execute the data manipulating instructions to process the data. Furthermore, the data may be stored in the storage device 116 within the server 110. Alternatively, the server 110 may store the data manipulated in a storage device external to the server 110, such as magnetic disks, optical disks, etc. The data can be stored in various different formats, including both table and non-table formats. Unlike many conventional relational databases, the data format is not limited to tables. By storing multiple versions of the data for the clients 130A-130C, the server 110 may maintain data persistence for the clients 130A-130C. As such, the server 110 can act as a database for the clients 130A-130C. In some embodiments, results of the eval function may be output using the print function in the uniform representation and then be transmitted from the server 110 via the network 120 or any other InterProcesses Communications (IPC) to the clients 130A-130C. Some examples of using REPL in a separate process as a database are discussed in details below to further illustrate this concept.

One advantage of the above approach is the elimination of domain-specific language (DSL) in accessing database. DSL as used herein generally refers to a specialized language intended to solve problems in a specific area (such as database management) in an optimal way. A DSL typically has a small set of instructions for performing some specialized tasks (such as searching data, updating records, etc.). One example of a DSL is Sequential Query Language (SQL) commonly used to access database. Because REPL allows ready conversion of data manipulation instructions written in a generic programming language to and from a uniform representation suitable for network transmission, there is no need to use DSL in the program according to some embodiments of the invention. Furthermore, the above approach allows data to be stored in a more flexible way. Unlike conventional relational databases, the above approach does not require data to be provided in tables. Data in the form of regular objects can be stored remotely and retrieved back in an opaque way. A regular object generally refers to a logical entity containing data in a predetermined format, including non-table formats.

Figure 2:
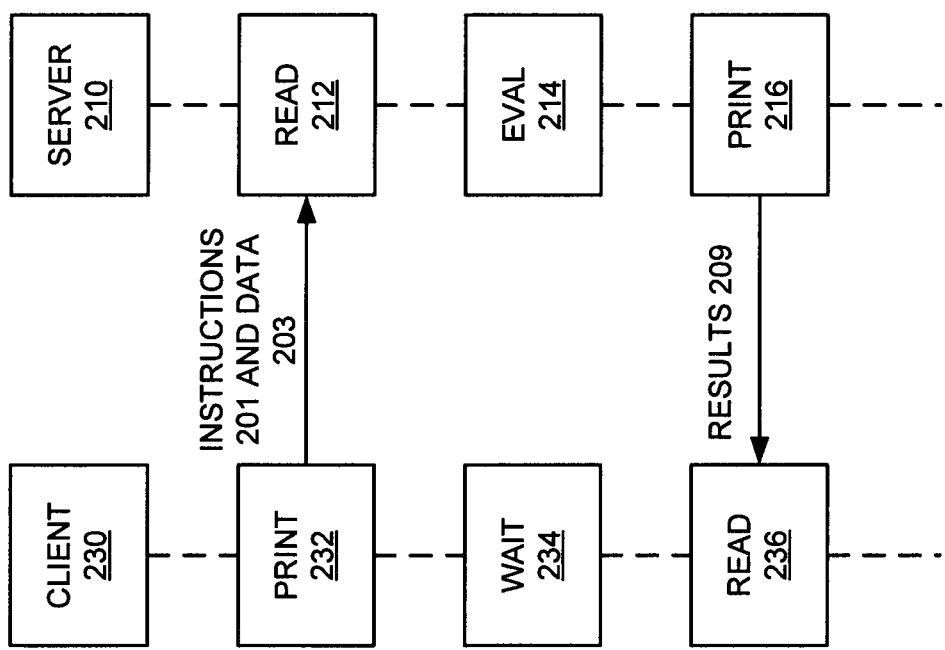
FIG. 2 illustrates one example of interaction between two separate REPL processes running on a client and a server, respectively.

FIG. 2 illustrates one example of interaction between two separate processes running on a client and a server, respectively. Both the client and the server have a REPL environment. This example illustrates the use of a programming language with REPL capability to organize homogeneous databases, where both client and server use the same programming language. This approach generally includes three items. First, REPL is used for automatic and opaque conversion of objects to uniform representation to pass through network between network hosts (or locally between different processes), which may run different compilers on different hardware architectures. Second, a powerful runtime language environment is used for automatic memory management. This includes new objects creation, changing values of already existing objects, deleting objects and freeing memory. Third, a powerful very-high-level language can be used for all data structures manipulation. This may eliminate the need to use DSL (e.g., SQL), which suffers from many well-known limitations, to manipulate data. One query-answer interaction between two REPL processes running on a client and a server, respectively, is discussed below to illustrate this concept.

Referring to FIG. 2, client 230 decides to query server 210. Client 230 has to send this query in the form of data manipulation instructions 201 (also referred to as program code) and the required data 203 (which may include objects) to server 210. The print function 232 of the REPL process running on client 230 converts the instruction 201 and data 203 to textual representation, which can be read back remotely by server 210. After converting the instruction 201 and the data 203, client 230 sends them to server 210 via a network, such as network 120 in FIG. 1. Server 210 uses the read function 212 of the REPL process running on server 210 to convert the instruction 201 and data 203 from textual representation to an internal format.

On the side of server 210, the received instruction 201 and data 203 are evaluated using the eval function 214 of the REPL process. While server 210 is busy, client 230 waits for a reply from server 210 at box 234. This step can also be implemented as asynchronous, event-driven interaction to eliminate waste of computing resources in idle time. After server 210 has finished evaluating, server 210 has some result 209 to send back to client 230. Server 210 may use the print function 216 of its REPL process to convert the result 209 to textual representation, and then send the result 209 to client 230. Client 230 may use its read function 236 to convert the result 209 from text representation to an internal format for further processing. Note that in the above interaction, the REPL processes running on both client 230 and server 210 hide all the work of data conversion, and allow client 230 to pass any code to server 210. More examples are discussed below to illustrate this concept.

In one example written in Common Lisp, a variable called "foo" is defined and set to 1 as follows:
* (defvar foo 1)
FOO
Here, * is a prompt of REPL, (defvar foo 1) is an input for REPL, and FOO at the end is a report from REPL. It reports for successful definition of a variable named "foo." Next, the following can be input to see what "foo" contains:
* foo
1
"foo" contains number 1. The following command tries to sum 2 and "foo":
* (+foo 2)
3
3 is a correct answer. Next, the same manipulation may be done in another REPL process running at a remote machine named "my-remote" as follows:
* (with-remote my-remote
   (defvar foo 1))
FOO
"foo" is defined now at "my-remote." Additional call to the function named "with-remote" may be made, which handles interaction with REPL and hides network communications. The code in all other aspects is similar to the code used in the local variant.

To check if "foo" contains the correct value, the following instruction may be used:
* (with-remote my-remote foo)
Additional calculation may be done using "foo" at the remote machine. For example,
* (with-remote my-remote
   (+foo 2))
3
Or, "foo" value can be used from remote in local computation as follows:
* (+(with-remote my-remote
   foo)
   2)
3
The above instruction asks the remote machine for "foo" value and uses it locally in the sum operation.

In a more complicated example, a list of numbers from 1 to 8 is defined on the server side and passed to the server a regular Lisp program to collect odd numbers from that list as follows:
* (witih-remote my-remote
   (defvar remote-list '(1 2 3 4 5 6 7 8)))
REMOTE-LIST
* (with-remote my-remote
   remote-list)
(1 2 3 4 5 6 7 8)
* (with-remote my-remote
   (loop for i in remote-list
      when (oddp i) collect i))
(1 3 5 7)
Furthermore, the client may have this list destroyed at the server, ask for its value, and catch exception, like it was all done locally:
* (with-remote my-remote
   (unintern 'remote-list))
T
Here, T means operation succeeded.
If the client tries to refer to a non-existing variable, the following may happen:
* (with-remote my-remote
   remote-list)
Error: The variable REMOTE-LIST is unbounded.
In form: (PROGN REMOTE-LIST)
At node: #N<HOST: "rhe15" LISP:"/usr/bin/sbcl—noin-form—core core">
[Condition of type SIMPLE-ERROR]
The remote server sends an exception to the client, and the client can catch it. The above examples illustrate that the client can pass data and data manipulating instructions to the server readily in the REPL environment without using any DSL. Furthermore, the data passed is not limited to data in table format. By executing the data manipulating instructions in a separate REPL process and maintaining data persistence, the server can act as a database for the client.

Figure 3:
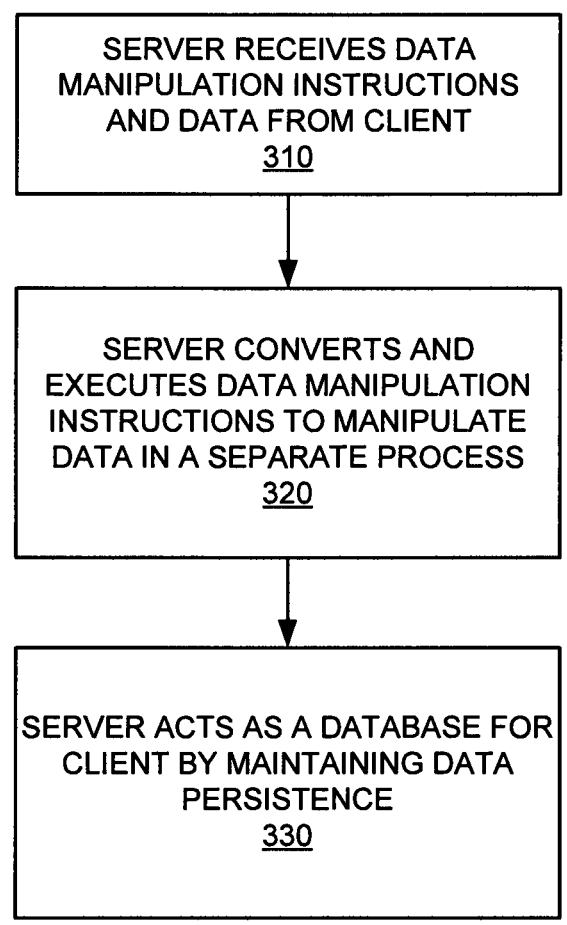
FIG. 3 illustrates a flow diagram of one embodiment of a method to use REPL in a separate process as a database.

FIG. 3 illustrates a flow diagram of one embodiment of a method to use a separate REPL process as a database. The method may be performed by processing logic that may comprise hardware (e.g., circuitry, dedicated logic, programmable logic, microcode, etc.), software (such as instructions run on a processing device), firmware, or a combination thereof. For instance, the computing system 400 illustrated in FIG. 4 may perform at least part of the method in some embodiments.

Initially, processing logic at a server receives data manipulation instructions and data from a client (processing block 310). For example, the server and the client may be communicatively coupled to each other like the server 110 and the client 130A in FIG. 1. The data manipulation instructions and data may be transmitted in a uniform representation via a network from the client to the server. In some embodiments, the client runs an interactive computer programming environment, such as REPL, and the data manipulation instructions and the data may be converted from an internal format into a format or representation suitable for transmission by a function (e.g., the print function in REPL) supported in the interactive computer programming environment. Then processing logic at the server converts and executes the data manipulation instructions to manipulate the data in a separate process (processing block 320). In some embodiments, processing logic runs in the same interactive computer programming environment on the server. For example, processing logic may run in a REPL environment on the server, and use the read function to convert the data manipulation instructions and data from their representation in which they are transmitted from the client to the server, into an internal format usable by the server. Then processing logic at the server may execute the data manipulation instructions to process the data in the REPL environment.

Furthermore, processing logic at the server may act as a database for the client by maintaining data persistence (processing block 330). In addition to processing data for the client, processing logic at the server may store the data on behalf of the client in an internal storage device (e.g., a hard drive) and/or in an external storage device (e.g., an optical disk, a magnetic disk, etc.). To maintain data persistence for the client, processing logic at the server may store a copy of the data periodically and/or as the data is changed. As such, the client may send data to and retrieve data from the server, and use the server as a database, but without having to use any DSL (such as SQL) in order to access data on the server because of the built-in data conversion support of the REPL environment. Thus, the client may refer to the server as a REPL-based database.

FIG. 4 illustrates a diagrammatic representation of a machine in the exemplary form of a computing system 400 within which a set of instructions, for causing the machine to perform any one or more of the methodologies discussed herein, may be executed. In alternate embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computing system 400 includes a processing device 402, a main memory 404 (e.g., read-only memory (ROM), flash memory, dynamic random access memory (DRAM) such as synchronous DRAM (SDRAM), a static memory 406 (e.g., flash memory, static random access memory (SRAM), etc.), and a data storage device 418, which communicate with each other via a bus 432.

Processing device 402 represents one or more general-purpose processing devices such as a microprocessing device, a central processing unit, or the like. More particularly, the processing device may be complex instruction set computing (CISC) microprocessing device, reduced instruction set computing (RISC) microprocessing device, very long instruction word (VLIW) microprocessing device, or processing device implementing other instruction sets, or processing devices implementing a combination of instruction sets. Processing device 402 may also be one or more special-purpose processing devices such as an application specific integrated circuit (ASIC), a field programmable gate array (FPGA), a digital signal processing device (DSP), network processing device, or the like. The processing device 402 is configured to execute the REPL-based database 426 for performing the operations and steps discussed herein.

The computing system 400 may further include a network interface device 408. The computing system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a computer-accessible storage medium 430 (also known as a computer-readable storage medium) on which is stored one or more sets of instructions (e.g., REPL-based database 422) embodying any one or more of the methodologies or functions described herein. The REPL-based database 422 may also reside, completely or at least partially, within the main memory 404 and/or within the processing device 402 during execution thereof by the computing system 400, the main memory 404 and the processing device 402 also constituting computer-accessible storage media. The REPL-based database 422 may further be transmitted or received over a network 420 via the network interface device 408.

While the computer-readable storage medium 430 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical and magnetic media, etc.

The REPL-based database 428, components and other features described herein (for example, in relation to FIG. 1) can be implemented as discrete hardware components or integrated into the functionalities of hardware components, such as ASICS, FPGAs, DSPs, or similar devices. In addition, the automatic documentation generator 428 can be implemented as firmware or functional circuitries within hardware devices. Further, the REPL-based database 428 can be implemented in any combination of hardware devices and software components.

Thus, some embodiments of a system and a method to use a separate process in an interactive computer programming environment as a database have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
executing, by a processing device, data manipulating instructions written in a generic programming language to manipulate data, wherein both the data manipulating instructions and the data are from a client that is running in a first Read-Eval-Print Loop (REPL) environment; and
acting, by the processing device, as a database for the client by maintaining persistence of the data, wherein the processing device runs in a second Read-Eval-Print Loop (REPL) environment and the database functions as the REPL database.

2. The method of claim 1, wherein the data comprises objects and the method further comprises:

converting, by the processing device in the second REPL environment, the objects and the data manipulation instructions from a uniform representation, suitable for transmission through networks, to an internal format usable by the processing device;

evaluating, by the processing device in the second REPL environment, the data manipulation instructions against the objects;

converting, by the processing device in the second REPL environment, results of the evaluating into the uniform representation; and sending, by the processing device, the results in the uniform representation to the client.

3. The method of claim 1, wherein the data comprises objects and the method further comprises:

storing, by the processing device, a first one or more of the objects in a non-table format and a second one or more of the objects in a table format.

4. The method of claim 1, wherein the generic programming language is Common Lisp.

5. The method of claim 1, wherein the data manipulating instructions are written solely in the generic programming language without any domain-specific language (DSL).

6. An apparatus comprising:

a memory;

a processing device coupled to the memory, the processing device to execute data manipulating instructions written in a generic programming language to manipulate data, wherein both the data manipulating instructions and the data are from a client running in a first Read-Eval-Print Loop (REPL) environment, and to act as a database for the client to maintains persistence of the data for the client, wherein the processing device runs in a second Read-Eval-Print-Loop (REPL) environment and the database functions as the REPL database.

7. The apparatus of claim 6, wherein the data comprises objects and the processing device converts the objects and the data manipulation instructions from a uniform representation, suitable for transmission through networks, to an internal format, evaluates the data manipulation instructions against the objects, converts results of evaluation into the uniform representation, and sends the results in the uniform representation to the client.

8. The apparatus of claim 6, wherein the data comprises objects and the apparatus further comprises:

a storage device coupled to the processing device, to store a first one or more of the objects in a non-table format and a second one or more of the objects in a table format.

9. The apparatus of claim 6, wherein the generic programming language is Common Lisp.

10. The apparatus of claim 6, wherein the data manipulating instructions are written solely in the generic programming language without any domain-specific language (DSL).

11. A non-transitory computer-readable storage medium embodying instructions that, when executed by a processing device, will cause the processing device to perform a method comprising:

executing, by the processing device, data manipulating instructions written in a generic programming language to manipulate data, wherein both the data manipulating instructions and the data are from a client that is running in a first Read-Eval-Print Loop (REPL) environment; and acting, by the processing device as a database for the client by maintaining persistence of the data, wherein the processing device runs in a second Read-Eval-Print Loop (REPL) environment and the database functions as the REPL database.

12. The non-transitory computer-readable storage medium of claim 11, wherein the data comprises objects and the method further comprises:

converting, by the processing device in the second REPL environment, the objects and the data manipulation instructions from a uniform representation, suitable for transmission through networks, to an internal format usable by the server;

evaluating, by the processing device in the second REPL environment, the data manipulation instructions against the objects;

converting, by the processing device in the second REPL environment, results of the evaluating into the uniform representation; and sending, by the processing device, the results in the uniform representation to the client.

13. The non-transitory computer-readable storage medium of claim 11, wherein the data comprises objects and the method further comprises:

storing, by the processing device, a first one or more of the objects in a non-table format and a second one or more of the objects in a table format.

14. The non-transitory computer-readable storage medium of claim 11, wherein the generic programming language is Common Lisp.

15. The non-transitory computer-readable storage medium of claim 11, wherein the data manipulating instructions are written solely in the generic programming language without any domain-specific language (DSL).

* * * * *